March 14, 1950     W. P. DALRYMPLE     2,500,806
VALVE
Filed July 19, 1946

INVENTOR.
WILLIAM P. DALRYMPLE
BY *Wallace and Cannon*
ATTORNEYS

Patented Mar. 14, 1950

2,500,806

UNITED STATES PATENT OFFICE 2,500,806

VALVE

William P. Dalrymple, Rochester, N. Y., assignor to American Brake Shoe Company, New York, N. Y., a corporation of Delaware Application July 19, 1946, Serial No. 684,729

3 Claims. (Cl. 277—21)

The present invention relates to valves and particularly to that type of valves which are suitable for controlling the flow of a fluid, for example compressed air, from a source of supply to a storage receptacle or the like. The invention pertains more particularly to a combination check valve and unloader valve of simple construction which is designed to relieve the compression load on a fluid compressor, such as an air compressor, and also to control the flow of compressed air or the like from such compressor into a receptacle so that when the compressor is operating at an output pressure less than that of the storage receptacle, the reverse flow from the receptacle is automatically prevented.

In apparatus of the character referred to above, it has been the practice in the past to provide for releasing the compression of fluid compressors such as air compressors during starting operations. Compressors of the type referred to are commonly driven by electric motors which have relatively low starting torque and it is desirable that the load on the compressor be released temporarily to avoid overheating of the motor. Various types of valves, both automatic and manually controlled, have been employed for this purpose. Compressed air is commonly stored in storage receptacles such as cylindrical tanks and a check valve is commonly provided so that when the compressor is not operating, or is operating only at low speed as during starting, compressed fluid will not be lost from the storage receptacle.

In the past both the check valve means and the unloader means referred to above have commonly been complex in character and have been separately applied and manipulated. I have discovered that it is possible to combine these elements for mutual cooperation in a simple manner that is highly advantageous.

Accordingly, it is an object of my invention to assemble a check valve and an unloader valve as a single unit so arranged that the closing of one opens the other.

A further object is to design a combination check valve and unloader valve so that the elements thereof operate conjointly in response to the pressure and/or the volumetric rate of output of a source of fluid supply such as an air compressor.

A further object is to combine a self opening unloader mechanism with a self closing check valve in such a manner that an air compressor connected to such an assembly will be automatically opened to take the load off the compressor during starting operations while retaining compressed fluid, such as air, that is being held in storage.

Another object of my invention is to combine a check valve with an unloader valve in such a manner that the check valve will open partially and permit a limited flow of compressed fluid, such as air, to build up pressure for closing the unloader valve as a source of supply, such as an air compressor, builds up to an operating pressure and volume output range.

Still another object is to accomplish all the foregoing with a minimum number of mechanical elements.

An additional object is to construct an automatic compressor unloader in such a manner that it may be adjusted to insure its proper closing and the proper opening of an operably connected check valve when the pressure and/or the volumetric output for example of an air compressor, has reached a desired operating level.

Other and further objects of the present invention will be apparent from the following description and claims and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 2:
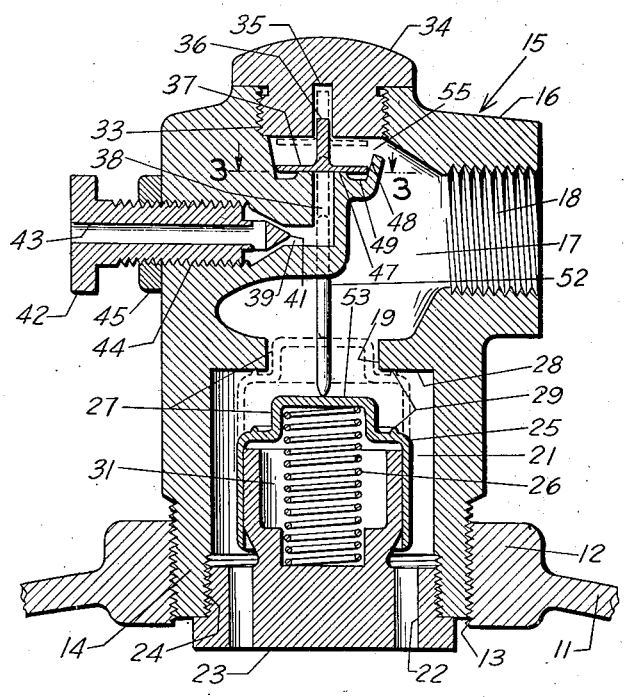
Fig. 2 is a vertical sectional view, taken substantially along the line 2—2 of Fig. 1, showing the internal construction of my improved valve assembly and showing the unit attached to a portion of a storage receptacle.

As is best shown in Fig. 2, the device which constitutes the present invention is mounted in the upper part of a storage receptacle such as a tank 11 provided with a boss 12 which is threaded internally, as indicated at 13, to receive in fluid tight relation the externally threaded base portion 14 of the valve assembly unit 15. The valve unit 15 comprises a body portion 16 which may be a casting of suitable material, such as bronze or brass, for example, provided with an inlet opening 17 which is internally threaded as at 18 to receive a connection from a source of fluid supply.

The source of fluid supply may be the output connection of an air compressor, or it may be preferably the outlet end of an after-cooler connected to a compressor, where the use of such an after-cooler is desirable. Thus compressed air flows into the valve assembly through the inlet 17 and in the normal functioning of the assembly it passes downwardly through an opening 19 in the valve body 16 to an outlet chamber 21 which connects with a series of openings 22 in a plug 23 which is threaded as at 24 into the base portion 14 referred to above. From the openings 22 compressed air normally passes into the storage receptacle where it is retained under pressure by the action of a check valve member 25 which is normally urged upwardly by a spring 26 to close the opening 19 when the pressure in the inlet 17 is less than that in the storage receptacle, as when the compressor, for example, is not operating.

The valve member 25 consists of a hollow cylindrical crown element 27 which is of a size adapted to fit freely within the opening 19, permitting a limited flow of fluid such as air between its periphery and the surrounding wall of the opening 19. On its lower surface the wall 19, which defines the check valve opening, is surfaced as at 28 to form a valve seat and the valve member 25 is formed with a sealing surface, as indicated at 29, to fit tightly against the seat 28 and completely close the valve when in the fully raised position shown by dotted lines in Fig. 2. However, when the valve is not quite fully raised to this position, and the sealing element 29 is not firmly pressed against the seat 28, a limited flow of fluid as compressed air between the crown 27 and the sides of opening 19 is permitted as mentioned above.

The lower part of the valve element 25 comprises a cylindrical skirt portion which surrounds an upwardly extending boss or stud portion of the plug member 23. This boss portion is hollowed internally to provide a seat for the spring 26. In addition an enlarged chamber 31 is provided which serves as an air cushion to dampen vibration of the valve member 25 and to slow down its response to rapid fluctuations which may occur in the air compressor. The further purpose of this construction will be explained more fully hereinafter.

The upper end of the valve body 16 is provided with an internally threaded opening 33 which is closed by a threaded plug 34 having an opening 35 drilled in the lower face thereof to receive the extending upper guide stem 36 of an unloader valve disc closure element 37. This valve element 37 consists of a flat disk which is adapted to close an outlet port 38 which leads downwardly and then turns to the left, as seen in Fig. 2, to form a horizontal bore 39 which is adapted to be closed or partly closed by the needle point 41 of an adjustable needle valve element 42. This valve element is provided with an opening 43 so that when the valve 37 is open, air may flow from the compressor through the needle valve to the open atmosphere. Obviously, if desired, a tube could be connected from the valve member 42 to the intake side of the compressor if the fluid being compressed were of such a character as to make it desirable to prevent loss to the atmosphere.

The needle valve 42 is externally threaded as at 44 into a threaded recess in the valve body member 16 and a lock nut 45 is provided to retain the valve member in a desired adjusted position. By this means the size of the opening around the needle valve point 41 may be set as desired so as to restrict the rate of flow from the compressor to the free atmosphere, the purpose of this being more fully explained hereinafter.

The valve disk 37 cooperates with a valve seat 47 formed around the opening 38 to completely close the outlet or unloader when the valve disk 37 is fully seated. In addition, the disk 37 is received within a tapering pocket defined by guide walls 48 which are an integral part of the body member 16 so that as the disk moves from the dotted line position shown in Fig. 2 to the full line position where it is fully closed, the flow of fluid around its edges becomes more and more restricted. The full line positions of the valve elements in Fig. 2 are the positions they assume when the compressor, not shown, is in full operation.

Figure 1:
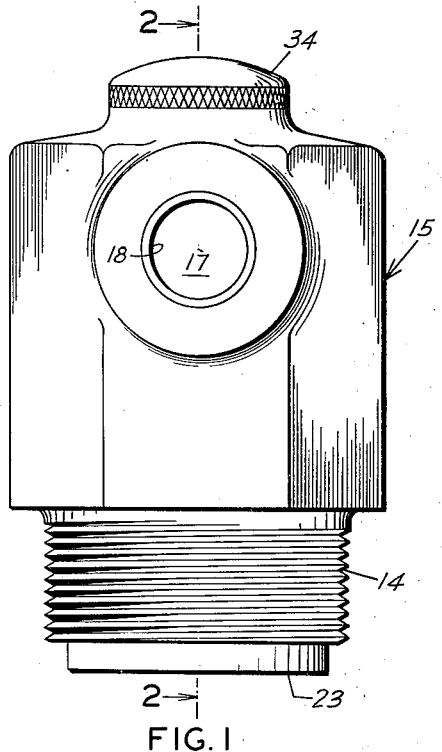
Fig. 1 is an elevational view of a combination check valve and unloader made according to my invention.
Figure 3:
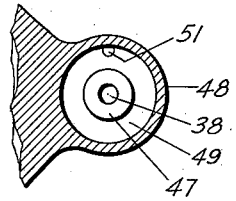
Fig. 3 is a horizontal sectional detail view taken substantially from the line 3—3, Fig. 2.

Between the annular guide wall element 48 and the seat 47, a depressed annular channel portion 49 is provided surrounding the valve seat and a vertical opening 51, as best shown in Fig. 3, is provided in this channel to receive a vertically extending rod 52 which extends as a strut between the lower face of the valve disk 37 and the upper surface 53 of the check valve member 25. The construction is such that when the check valve is fully closed, as shown in dotted lines, Fig. 2, the rod 52 raises the unloader valve off its seat and above the surrounding guide wall 48 to the dotted line position shown in Fig. 2 so that the unloader valve is fully open. The rate of flow of fluid, such as compressed air, to the free atmosphere is then completely controlled by the setting of needle valve 42. On the other hand, when the unloader valve is fully closed, as shown in full lines in Fig. 2, the rod 52 necessarily holds the check valve open.

The operation of the various elements described above is as follows: When the source of fluid pressure, an air compressor for example, is being started up, its pressure output is relatively low, and the volume of air flowing therefrom is small. In order to avoid over-loading the drive motor, which as indicated above is normally an electric motor but may be of some other type, the valve assembly 37 operates automatically to unload the compressor and allow the air being supplied thereby to flow past the needle valve 42 to the free atmosphere. There is at this time no substantial resistance to operation of the compressor and it may quickly approach its normal operating speed without material overload on the motor. However, as it approaches normal operating speed its volumetric output rate rapidly increases and the restricted flow channel at the point 41 of the needle valve 42 is inadequate to take care of the increasing volume. As a result, pressure begins to build up in the inlet chamber 17 and in the upper extension thereof indicated at 55 under the plug member 34 and above and surrounding the valve disk 37. The increased rate of flow past the disk 37 tends to drag it downwardly into the surrounding guide wall 48 and, as the disk is lowered, the air passage about its periphery becomes increasingly restricted by the convergence of the surrounding guide wall member 48 toward the edges of the disk. At the same time the increase in pressure has begun to move the check valve 25 downwardly to separate the sealing element 29 from the seat 28. In its fully raised position shown by dotted lines in Fig. 2 the force exerted by spring 26 on the check valve 25 is rather light, the spring 26 at such times being quite fully expanded. Hence, as soon as the pressure in the inlet 17 substantially exceeds that in the storage receptacle, or that in the outlet chamber 21, the check valve 25 is opened against air pressure below it and the resulting flow of air quickly builds up pressure in inlet chamber 17. This further increases flow velocity of air past the unloader valve disk 37 and the effect of such flow, plus increase of pressure above, is adequate to quickly close the unloader valve. The opening of the check valve permits the pin 52 to descend and thus allow the valve 37 to fully close.

It will be understood that the needle valve 42 may be adjusted to take care of the requirements of various sizes or various operating speeds of compressors. If the volumetric output of the compressor is small it may approach full operating speed without requiring a very large opening at the needle valve. On the other hand if the output rate is larger, the valve 42 should be opened wider so as to permit a greater volume of compressed fluid to be released before the unloader begins to close. It will be understood also that the characteristics of the check valve have an important bearing on the time of closing of the unloader valve. If the device is to be used with a wide range of compressors or the like, the spring 26 may need to be changed to meet widely varying conditions.

Figure 4:
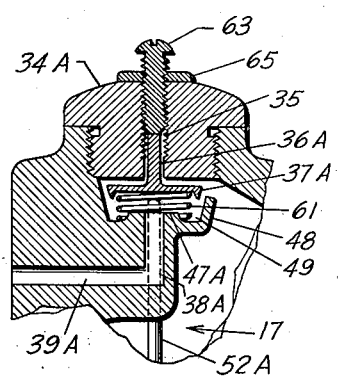
Fig. 4 is a fragmentary vertical sectional view corresponding in part to Fig. 2 showing a modified form of my invention.

In Fig. 4 a modified form is shown wherein the valve disk 37A corresponding to the valve 37 is normally held in a raised position by a light coil spring 61. This spring is seated in the annular recess 49 which in other respects is identical with that shown in Fig. 2. The guide wall member 48 which restricts flow of fluid around the disk as it approaches closed position also is identical in function and purpose with the same element in Fig. 2. The valve disk member 37A however, has its stem portion 36A seated in a threaded opening 35A under an adjustable screw 63 which is threaded into the plug 34A. A lock nut 65 is provided for holding the screw 63 in a desired position of adjustment.

A rod 52A, which is identical or substantially identical with the rod 52 shown in Fig. 2, extends below the valve disk 37 and rests on the upper surface of the check valve which is not shown in Fig. 4 but is identical with that shown in Fig. 2.

The seat element 47A of the unloader valve in Fig. 4 is substantially identical with that in Fig. 2, and the central opening 38A in the valve of Fig. 4 connects with a transverse bore 39A, but, unlike the construction in Fig. 2, no needle valve is provided. Instead the adjustment of the screw 63 against the stem 36A of the valve 37A is relied upon to dispose the disk in relation to the concentric surrounding guide wall member 48 so that the flow of fluid through the unloader is properly related to the operating speed and volumetric output of the compressor. Thus by adjusting the screw 63, the disk 37A is positioned within the restricted guide element 48 and the flow of air about the periphery of the disk and through the passages 48 and 49A to the free atmosphere is restricted and tends to drag the valve downwardly to closed position as the flow increases.

When the compressor approaches normal operating speed the force applied to the disk 37A by the rush of air about its periphery to the vent 39A is sufficient to not only drag the disk downwardly, but to apply force to the pin 52A which rests on the check valve 25. Hence the flow of air through the unloader assists in opening the check valve. Pressure in inlet chamber 17 is of course the major force in opening the valve 25. When opening occurs, air within the storage receptacle flows upwardly through the ports 22, Fig. 2, into the chamber 21 and through the restricted passage at 19 around the valve element 27 to quickly build up pressure within the upper or inlet compartment 17 and facilitate closing of the unloader valve 37A against the force of its spring 61.

It will thus be seen that in the modification of Fig. 4, as in the embodiment of Fig. 2, the partial opening of the check valve and the consequent build up of pressure in chamber 17, is relied upon to supply part of the force for completely closing the unloader when the motor driving the compressor attains normal operating speed. The simple expedient of a pin as 52 or 52A extending between the two valve members insures that closing of the check valve will open the unloader when, for example, the compressor is shut down. Thus the compressor is normally free to the open atmosphere for starting and, on the other hand, as soon as operating pressure is attained and the compressor brought up to speed, the closing of the unloader assists in the positive and wide opening of the check valve so as to provide for free and unrestricted entry of fluid from the compressor into the storage receptacle 11.

The air chamber 31 within the valve member 25 is in communication with the air in the chamber 21, but since the sleeve 25 fits quite snugly about the stud member 23, the chamber 31 is not as responsive to changes in pressure as other parts of the assembly. Hence, it acts as a dash pot, serving to dampen vibration caused by pressure surges to prevent chattering of the valve 25 in response to variation in the pressure output of the air compressor.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A combination check valve and unloading valve comprising a valve body member having an outlet port adapted to be connected to a compressed air storage receptacle, and an inlet port adapted to be connected to the output of an air compressor for feeding compressed air to said outlet port, a check valve mounted in said housing between said ports and adapted to be opened when pressure of air supplied to said inlet port exceeds the pressure of air at said outlet a predetermined amount, a spring connected to said check valve and tending to close the latter, means affording a relief port in said housing, means affording a passageway for establishing communication between said relief port and said inlet port for feeding air from said inlet port into said relief port, an unloader valve mounted in said passageway and movable into and out of closed relation to said relief port for controlling the flow of air into the latter from said inlet port, said unloader valve affording an obstruction in said passageway in a manner whereby said unloader valve is responsive to the flow of air through said passageway and is adapted to be closed automatically by such air when the volumetric rate of flow of air through said passageway past said unloader valve reaches a predetermined maximum, and means operatively connecting said check valve and said unloader valve in a manner whereby closing of said check valve is operable to open said unloader valve, and closing of said unloader valve is operable to open said check valve.

2. A valve comprising a valve housing having an inlet port for receiving working fluid and an outlet port for discharging working fluid a partition member in said housing and dividing the interior thereof into an inlet chamber and an outlet chamber, said inlet port opening into said inlet chamber, and said outlet port opening into said outlet chamber, said partition member having a port therethrough, a valve seat on said partition member and positioned around said last named port, said housing having a relief port in communication with the atmosphere, another valve seat in said housing defining the inner end of said relief port, means defining a tapered passageway affording communication between said relief port and said inlet chamber for discharging working fluid admitted through said inlet port to the atmosphere, a valve member in said tapered passageway for controlling the flow of working fluid from said inlet chamber through said relief port, said valve member being movable through said tapered passageway to afford an obstruction therein and being responsive to the volume of fluid passing from said inlet chamber through said relief port so as to close automatically against said other valve seat when said volume exceeds a predetermined amount, a check valve mounted in said outlet chamber for controlling the flow of working fluid through said port in said partition member, spring means urging said check valve toward closed position relative to said first mentioned valve seat, said check valve being adapted to open when the pressure of working fluid in said inlet chamber exceeds the pressure of working fluid in said outlet chamber a predetermined amount, and an elongated member operatively interconnecting said valve member and said check valve whereby closing of said check valve is effective to open said valve member and closing of said valve member is effective to open said check valve.

3. A valve comprising a housing having an inlet port adapted to be connected to a source of fluid pressure, an outlet port adapted to be connected to a receiver, and an internal passageway operatively connecting said ports, a partition member in said passageway dividing the latter into an inlet chamber and an outlet chamber, said partition having a valve port therein affording a passageway for fluid to flow between said chambers, a check valve in said outlet passageway for controlling the flow of fluid through said valve port, said check valve comprising a cylinder reciprocably mounted on a stationary piston mounted in said outlet chamber, said cylinder being movable on said piston into and out of closing relation to said valve port, a spring mounted between said cylinder and piston urging said cylinder toward closed position, said cylinder being adapted to move into open position when the fluid pressure in said inlet chamber exceeds the fluid pressure in said outlet chamber a predetermined amount, said housing having a relief passageway formed therein, said relief passageway having one end opening to the atmosphere and the other end opening to the interior of said housing, means including an outwardly flaring flange affording a tapered passageway operatively connecting said other end of said relief passageway with said inlet chamber, a valve member mounted in said tapered passageway and movable into open and closed position relative to said other end of said relief passageway, said valve member being responsive to the volume of fluid flowing through said tapered passageway from said inlet chamber so as to close automatically when said volume exceeds a predetermined amount, and an elongated plunger mounted in said housing and extending between said cylinder and said valve member in a manner whereby closing of said check valve is effective to open said valve member and closing of said valve member is effective to open said check valve.

WILLIAM P. DALRYMPLE.

REFERENCES CITED

The following references are of record in the file of this patent:

UNITED STATES PATENTS

| Number | Name | Date |
|---|---|---|
| 1,215,071 | Steedman | Feb. 6, 1917 |
| 1,421,309 | Redfield | June 27, 1922 |
| 1,428,981 | Redfield | Sept. 12, 1922 |
| 1,850,117 | McMillan | Mar. 22, 1932 |
| 2,015,801 | Johnson | Oct. 1, 1935 |

FOREIGN PATENTS

| Number | Country | Date |
|---|---|---|
| 460,088 | France | Sept. 25, 1913 |